(12) United States Patent
Creasey et al.

(10) Patent No.: US 8,370,550 B2
(45) Date of Patent: Feb. 5, 2013

(54) RULE-BASED ASSIGNMENT OF CONTROL OF PERIPHERALS OF A COMPUTING DEVICE

(75) Inventors: Jack Creasey, Redmond, WA (US);
Clark David Nicholson, Seattle, WA (US); Kanchan Mitra, Woodinville, WA (US); Robert C. Elmer, Redmond, WA (US); Kaushik Barat, Bellevue, WA (US); Jai Srinivasan, Kirkland, WA (US); Jay Curtis Beavers, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 273 days.

(21) Appl. No.: 12/839,274

(22) Filed: Jul. 19, 2010

(65) Prior Publication Data

US 2011/0202750 A1 Aug. 18, 2011

Related U.S. Application Data

(60) Provisional application No. 61/304,077, filed on Feb. 12, 2010.

(51) Int. Cl.
*G06F 13/00* (2006.01)

(52) U.S. Cl. ............... 710/104; 710/8; 710/10; 710/313

(58) Field of Classification Search ............... 710/8, 10, 710/104, 302, 303, 313
See application file for complete search history.

(56) References Cited

U.S. PATENT DOCUMENTS

| | | | |
|---|---|---|---|
| 6,185,641 B1 | 2/2001 | Dunnihoo | |
| 6,415,343 B1 * | 7/2002 | Fensore et al. | ................ 710/104 |
| 6,567,875 B1 | 5/2003 | Williams et al. | |
| 6,754,811 B1 | 6/2004 | Cato | |
| 6,832,273 B2 | 12/2004 | Ray et al. | |
| 6,976,105 B1 * | 12/2005 | Wright | ........................ 710/104 |
| 7,127,678 B2 | 10/2006 | Bhesania et al. | |
| 7,290,072 B2 | 10/2007 | Quraishi et al. | |
| 7,493,502 B2 | 2/2009 | Hsieh | |
| 7,502,878 B1 | 3/2009 | Wright | |
| 7,535,433 B2 | 5/2009 | Ledebohm | |
| 7,546,599 B2 | 6/2009 | Nesher | |
| 7,562,161 B2 | 7/2009 | Maciesowicz | |
| 7,564,425 B2 | 7/2009 | Martinez | |
| 7,660,937 B2 | 2/2010 | Frantz et al. | |
| 2001/0005844 A1 | 6/2001 | Kobayashi | |
| 2002/0105553 A1 | 8/2002 | Segre | |
| 2005/0086403 A1 * | 4/2005 | Tang | ............................ 710/104 |
| 2008/0155478 A1 | 6/2008 | Stross | |

(Continued)

OTHER PUBLICATIONS

Ganssle, "An Introduction to USB Development," Embedded Systems Programming. Mar. 2000.

(Continued)

*Primary Examiner* — Glenn A Auve

(57) ABSTRACT

Described herein are various techniques and principles for determining how to assign control of peripherals and assigning control of peripherals. In some embodiments, determining how to assign control of peripherals comprises reviewing connections of peripherals to the computing device and evaluating rules to determine management points in the connections. In some cases, the connections of peripherals to the computing device may be organized into a hierarchy corresponding to a hierarchy of physical connections of the peripherals, including physical connections of peripherals located remote from the computing device and possibly connected through another computing device. When management points are identified among the connections, control of peripherals associated with the management points may be assigned in the same way. For example, access rights to each of the peripherals may be assigned to a same user session.

18 Claims, 13 Drawing Sheets

U.S. PATENT DOCUMENTS

| | | |
|---|---|---|
| 2009/0064038 A1 | 3/2009 | Fleischman |
| 2009/0177774 A1 | 7/2009 | Rehman et al. |
| 2009/0177863 A1 | 7/2009 | Rehman et al. |
| 2009/0282234 A1 | 11/2009 | Faraboschi et al. |
| 2010/0064065 A1 | 3/2010 | Depta et al. |
| 2010/0169523 A1* | 7/2010 | Dunstan et al. ............... 710/104 |

OTHER PUBLICATIONS

Wong, "An Embedded Chip for USB Application: from the Architecture to Implementation," International IC '99. 1999.

"International Search Report", Mailed Date: Oct. 14, 2011, Application No. PCT/US2011/023803, Filed Date: Feb. 4, 2011, pp. 8.

\* cited by examiner

RULE-BASED ASSIGNMENT OF CONTROL OF PERIPHERALS OF A COMPUTING DEVICE

RELATED APPLICATIONS

This application claims priority under 35 U.S.C. §119(e) to U.S. Provisional Application Ser. No. 61/304,077, entitled "Managing USB devices based on logical groups," filed on Feb. 12, 2010, which is herein incorporated by reference in its entirety.

BACKGROUND

Computing devices, including personal computers, are typically adapted to be operated by one user at a time. Such a computing device is configured to allow the user to interact with all peripherals connected to the computing device, including user interface peripherals like a display, keyboard, and mouse. When the computing device first starts and detects connected peripherals, or when a peripheral is newly attached to the computing device, the computing device is configured to manage each of those peripherals in the same way. The computing device may provide access to each of the peripherals to all users of the computing device or to the user that is presently operating the computing device.

In some cases, a computing device may be operated by more than one user at a time. In some such cases, assigning ownership of or access to individual peripherals to certain users may be desirable. This may be done such that more than one user does not attempt to access a peripheral at a same time, to protect the privacy of data stored by each a user on a peripheral, or to ensure that each user is able to interact with the computing device with a full set of user interface peripherals (e.g., such that each user has a display, keyboard, and mouse). Because the computing device does not have functionality to manage peripherals differently and to assign peripherals to different users, in such cases the users or an administrator will manually configure the computing device to assign peripherals to each user. To assign the peripherals, the user or administrator will examine the set of available peripherals and select peripherals to be assigned to each user, then reconfigure the computing device to identify the selected peripherals can be accessed and used only by the identified user.

SUMMARY

Conventional techniques for assigning peripherals connected to a computing device to different users are limited to performing such assignment manually, according to direct input from a user or administrator. Such a process can be time consuming and difficult. Additionally, such a process requires knowledge of how peripherals are organized and managed by a computing device so that information about the peripherals can be located on the device and the peripherals can be assigned. Further, this process must be completed each time a peripheral is to be assigned, including when new peripherals are connected to the computing device.

Described herein are techniques for assigning control of peripherals based at least in part on physical connections of the peripherals to a computing device. In some embodiments, control of peripherals connected to the computing device in a similar fashion is assigned in a similar fashion. For example, when peripherals are connected to the computing device via a hub, control of all peripherals connected to the hub or that are later connected to the hub may be assigned in a similar way, such as being assigned to a same user session. In embodiments, assigning control of peripherals may be carried out after physical connections of peripherals to the computing device have been identified and rules have been applied to identify management points, which are points at which decisions can be made regarding assignment of control of peripherals. When the physical interconnections of the peripherals is determined to be a hierarchy of physical connections, all peripherals below a management point in the hierarchy may have control assigned in a same way.

In one embodiment, a hierarchy of physical connections of peripherals to a computing device is evaluated using one or more rules for determining a location of management points in a hierarchy of physical connections of peripherals to a computing device. In this embodiment, the rules may identify management points by identifying points in the hierarchy below which are peripherals forming a terminal group for a user session. The terminal group may include a minimum set of devices for a user to interact with the computer device, such as a display, keyboard, and mouse. When reviewing the hierarchy, multiple management points for multiple terminal groups may be identified. After the management points are identified, control of peripherals below each management point in the hierarchy may be assigned similarly. For example, control of all peripherals below a management point may be assigned to a user session.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
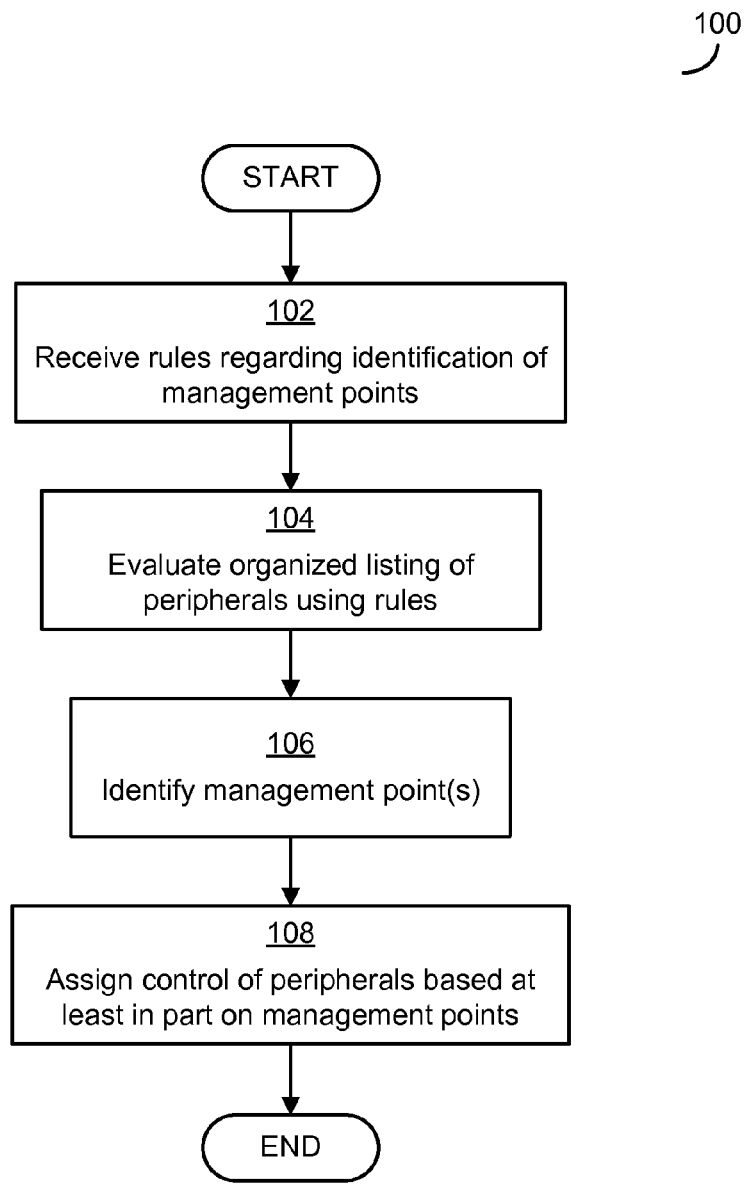
FIG. 1 is a flowchart of one exemplary process for assigning control of peripherals based at least in part on management points.

When a peripheral is connected to a computing device, using conventional techniques the peripheral may be made available to all users of the computing device, without ownership of or access to the peripheral being assigned to any particular user or user session. This practice may introduce problems in the computing device. For example, security problems may arise, such as where the peripheral is a storage device storing sensitive information that should only be accessed by a user that owns the storage device. When the peripheral is not assigned to a particular user, other users may access the peripheral, which may compromise the sensitive information. As another example, access problems may arise, such as (using the above example again, where the peripheral is a storage device) where a user assumes that the user has exclusive access to the storage device and performs some work based on that assumption, and discovers later that another user has accessed and manipulated data on the storage device in a way that complicates the user's work.

Assignment of control of peripherals to particular users or user sessions may remedy some of these problems. Using conventional techniques, however, to assign peripherals to users or user sessions, the user or an administrator would have to make low-level changes in the operating system manually, through providing explicit input. Such a process requires knowledge not only of how and where the particular operating system stores information about peripherals, but also about user sessions and how to assign control of peripherals to user sessions. Such a manual process is intensive, even where a user has the required knowledge.

When peripherals are connected to a computing device used by multiple users, often each peripheral that is connected by a user may be physically connected to the computing device in a similar way. For example, peripherals connected by a user may be connected to ports on the computing device that are physically close on the computing device. As another example, external hubs may be used to connect peripherals to a computing device, so as to increase a number of available ports, and peripherals connected by a user may be connected to ports of a particular hub.

By examining the physical connections of peripherals to the computing device, peripherals that were connected by a particular user and that the particular user intends to use may be identified. This may be done by identifying similarly-connected peripherals. Peripherals that are similarly connected may have been connected by a same user. Accordingly, assigning control of peripherals of a computing device may be done by reviewing connections of peripherals to the computing device to identify similarly-connected peripherals.

Described herein are various techniques and principles for determining how to assign control of peripherals and assigning control of peripherals. In some embodiments, determining how to assign control of peripherals comprises reviewing connections of peripherals to the computing device and evaluating rules to determine management points in the connections. In some cases, the connections of peripherals to the computing device may be organized into a hierarchy corresponding to a hierarchy of physical connections of the peripherals. When management points are identified among the connections, control of peripherals associated with the management points may be assigned in the same way. For example, access rights to each of the peripherals may be assigned to a same user session.

As used herein, a peripheral is an electronic device that may be attached to a computing device via any suitable wired and/or wireless communication bus. Examples of buses that may be used in embodiments include USB 1.1/2.0/3.0, PS/2, Bluetooth, infrared, and FireWire, though others are possible.

A peripheral may be physically separate from the computing device and encased in a separate housing from the computing device, or may be physically attached to the computing device and encased in a same housing. In some wired and/or wireless communications buses with which embodiments may operate, peripherals may be connected to the computing device directed and/or connected to the computing device in a hierarchy. The hierarchy may allow some peripherals to be connected to the computing device indirectly, via other peripherals or other devices. In some embodiments, peripherals may be connected via hubs that permit multiple peripherals to be connected to the computing device via a single point. Multiple hubs may be used in some cases, and may appear at multiple points in the hierarchy. In some cases, a hub may be incorporated into a peripheral, rather than being separate from peripherals. For example, a keyboard may be connected to a computing device and may include, in the housing of the keyboard, a port to permit another device to be connected to the keyboard.

As discussed above, in some embodiments management points may be used in assigning control of peripherals. A management point may be any point at which policy may be applied to a set of peripherals. The policy, in this case, may be assignment of control of the peripherals, and as such a management point may be any point at which one or more peripherals may be identified and control of those peripherals assigned in a similar manner. Management points may be identified by evaluating connections of peripherals to the computing device using one or more rules. The rules may relate in any suitable manner to physical connections of peripherals. In some cases, the rules may identify a management point to be a group of similarly-connected peripherals. In other cases, the rules may specify that intermediate nodes in the hierarchy are management points. In other cases, intermediate nodes in the hierarchy may be determined to be eligible management points and other rules may be evaluated to determine whether an eligible node is a management point, such as by evaluating peripherals connected below that node in the hierarchy. In some cases the peripherals connected below a node in the hierarchy may be evaluated to determine whether particular peripherals are below the node.

In embodiments, control of peripherals may be assigned to a user or user session. A user of a computing device may be an account or profile created on the computing device and which a person uses to access and operate the computing device. When a user is logged in to the computing device or is operating the computing device, a user session may be created for the user that persists while the user is logged in or operating the computing device. A user session may provide a unique instance of an operating system environment for a user, including a unique instance of various system resources. Processing performed by a user within a user session may be partitioned from other users and other user sessions, though users may be able to communicate between sessions.

In embodiments, control of peripherals may be assigned to one or more users and/or to one or more user sessions. For ease of description, in various exemplary embodiments described below, peripherals may be described as being assigned to one user. Embodiments are not limited, however, to assigning peripherals to a single user or to users. For example, as described below in connection with FIG. 5, a peripheral like a printer could be assigned to multiple different users. Additionally, control could be assigned in any other manner, as embodiments are not limited in this respect.

Control of peripherals may be assigned in any suitable manner. The manner of assignment may vary in embodiments based on how a computing device manages peripherals and access rights. Assignment of control of peripherals may comprise assigning ownership of a peripheral. In some embodiment, assigning ownership of a peripheral may comprise assigning all access rights and/or management rights to a user (or user session). Assignment of control of peripherals may alternatively comprise assigning all or some access rights. Access rights may include rights to use the peripheral in specified ways, such as read access or write access, while management rights may include rights to alter the peripheral, such as altering software or settings of the peripheral or disconnect the peripheral. Embodiments are not limited to carrying out any particular type of assignment of control. Additionally, assigning control of peripherals may include assigning control of portions of peripherals, such as where control of one time-based or physical portion of a peripheral is assigned in one way and control of another time-based or physical portion of a peripheral is assigned in another way. For example, different portions of a display screen may be assigned for use by different user sessions.

In some embodiments, control of peripherals may be additionally assigned based on instructions received from a software facility. In some such embodiments, when a peripheral is connected, a query may be carried out first, before rules are evaluated, to determine whether instructions regarding how to assign control of the peripheral will be received from a software facility. Some embodiments that receive such instructions from software facilities may use techniques described in U.S. Provisional Patent Application No. 61/304,039, filed Feb. 12, 2010, entitled "Assigning interface devices to terminal groups" ("the '039 application") and in non-provisional U.S. patent application Ser. No. 12/817,766, filed Jun. 17, 2010, entitled "Assignment of control of peripherals of a computing device," and claiming priority to the '039 application ("the '766 application"), both of which are incorporated herein by reference in their entirety and at least for their discussion of assignment of control of peripherals based on instructions received from software facilities.

Described below are various exemplary embodiments of systems that enable assignment of control of peripherals based on evaluating connections of peripherals to a computing device. The embodiments described below are merely illustrative of ways in which some embodiments may operate. Embodiments are not limited to operating according to the exemplary techniques described below.

FIG. 1 shows one exemplary process that may be carried out in some embodiments for assigning control of peripherals based on evaluation of rules. Embodiments are not limited to carrying out the process 100 shown in FIG. 1, as other processes are possible.

Prior to the start of process 100, one or more peripherals may have been connected to a computing device. The peripherals may have been connected before the computing device is turned on, while the computing device is operating, or at any other time. The peripherals may be connected to the computing device in any suitable manner, including by being directly connected to the computing device (e.g., via cables connected directly between the peripheral and a physical port of the computing device, or via a single wireless transmission between the peripheral and a receiver of the computing device) or being indirectly connected to the computing device. Peripherals may be indirectly connected by being connected via another device such as another peripheral or a hub.

When the peripherals are connected, a device management facility on the computing device may review the peripherals connected to the computing device and create, based on that review, an organized listing of peripherals connected to the computing device that identifies a topology of connections of the peripherals to the computing device. This organized listing may be organized according to how peripherals are connected to the computing device, including by organizing peripherals according to which bus the peripherals are connected and according to a way in which the peripherals are connected to the computing device on that bus. In some cases, where peripherals are connected hierarchically, the device management facility may create a hierarchical structure that illustrates the connections of peripherals to the computing device. In this way, a topology of the organized listing of peripherals may have a topology similar to the topology of connections of the peripherals to the computing device.

Additionally, as discussed above, prior to the start of process 100 and the evaluation of rules, in some embodiments one or more instructions may be received from software facilities regarding assignment of control of peripherals, as discussed in the '039 and '766 applications referenced above. Accordingly, prior to the start of the process 100, control of some peripherals may have been assigned.

Process 100 begins in block 102, in which rules are received at a peripheral management facility that specify how management points for peripherals are to be identified. The rules may be received in any suitable format for being evaluated by a peripheral management facility that assigns control of peripherals. Additionally, the rules may be received in any suitable manner from any suitable source. Embodiments are not limited in these respects.

In some embodiments, receiving of the rules in block 102 may include receiving the rules at the computing device from a user or an administrator that enters the rules via an interface of the computing device. In other embodiments, the rules may be received as a part of a policy received at the computing device. The policy received at the computing device may be any suitable policy, including a policy specified by a network and provided to the computing device when the computing device connects to the network.

The rules that are received in block 102 may be any rules for evaluating the organized listing of peripherals to the computing device to identify one or more management points to be used for assigning control of peripherals. One particular set of rules is discussed in connection with FIG. 11 below, though this set is just one example of the type of rules that may be used. In some embodiments, the rules that are received in block 102 may be rules for evaluating the organized listing to identify patterns in the organized listing. In such embodiments, management points may then be identified based on the patterns. For example, the rules may be used to evaluate the organized listing to identify peripherals that are similarly connected to the computing device. In some such cases, where the organized listing is organized in a hierarchy that matches a hierarchical topology of connections of peripherals, then the rules, when evaluated, may identify that an intermediate node of the hierarchy may be a management point. The rules may additionally or alternatively specify, in this case, that an intermediate node of the hierarchy that has a particular set of peripherals below the management point in the hierarchy is a management point. Though, embodiments are not limited to evaluating the organized listing in any particular manner or determining patterns in connections of peripherals in any particular manner. Embodiments are not limited to evaluating any particular set of rules or types of rules.

Regardless of how the rules are received in block 102 or what the rules are, in block 104, the organized listing of the connections of peripherals to the computing device is evaluated using the rules received in block 102. The evaluation of the organized listing may be carried out in any suitable manner, and may depend on what rules that are received in block 102 and the manner in which management points are to be identified using those rules. In some implementations, for example, a hierarchical topology may be reviewed by selecting a bottommost node (e.g., a peripheral in the hierarchy) and evaluating nodes above that node to identify potential management points, while in other implementations a top-down approach to evaluation may be carried out. In some cases, potential management points may be identified throughout an evaluation of an organized listing and may later, during the same evaluation of the organized listing, be determined not to be potential management points based on evaluation of other nodes or other rules.

Regardless of how the evaluation is conducted in block 104, in block 106 a set of management points is identified based on determinations made in the evaluation of the organized listing.

In block 108, control of peripherals is assigned based at least in part on the management points identified in block 106. In some implementations, management points may have been identified based on patterns in connections of peripherals. Each management point, in some such implementations, may therefore be related to a group of one or more peripherals identified as matching a pattern. For example, in cases where the peripherals are connected to the computing device in a hierarchical topology, the organized listing has a hierarchy that mirrors the hierarchical topology, the rules received in block 102 and evaluated in block 104 may identify management points as each intermediate node in the organized listing that has a particular set of peripherals below the node in the hierarchy. The peripherals below such intermediate nodes may then be identified as related to the management node. When, in block 108, control of peripherals is assigned based on management points, control of each peripheral related to a particular management point may have control assigned in a similar manner. For example, all peripherals related to the management point may have control assigned to a particular user or to a particular user session, as discussed further below. Though, embodiments are not limited to assigning control of peripherals in any particular manner.

In embodiments that assign control of peripherals to particular users or user sessions, the user or user session to which control is assigned may be identified in any suitable manner. For example, as discussed above, in some embodiments control of peripherals may be assigned based on instructions received from software facilities prior to the process 100 being performed. In such embodiments, when control of one or more peripherals related to a management point has been assigned in some manner, in block 108 all other peripherals related to that management point may have control assigned in the same manner. In this way, if control of a peripheral has been assigned to a user session based on an instruction received from a software facility, then all other peripherals related to the same management point may have control assigned to the same user session. As another example, input from a user or user session may be received via one or more peripherals. Control of peripherals related to the same management point as the peripheral(s) from which input was received may then be assigned to the user or user session from which input was received.

Once control of peripherals has been assigned in block 108, the process 100 ends. As a result of the process 100, control of the peripherals is assigned to particular users or user sessions, such that these peripherals may only be accessed or used by users or user sessions to which control was not assigned. Further, as discussed in greater detail below in connection with FIG. 4, when a user connects a new peripheral, when that peripheral is added to the organized listing by the device management facility, control of that peripheral may be assigned in the same manner as other peripherals related to that management point. Though, in some cases, depending on the rules received in block 102, addition of a particular peripheral or type of peripheral may make a management point, previously identified during process 100, break one or more rules received in block 102 and mean that the previously-identified management point may no longer be a management point. In such cases, the process 100 may be repeated to identify new management points based on the new organized listing and the new topology of connections of peripherals.

In embodiments that perform the process 100, control of peripherals may be assigned automatically, based on evaluations of rules, rather than relying on explicit user input for each peripheral as in conventional techniques. In such embodiments, assignment of control of peripherals may be carried out much more quickly and easily.

Figure 2:
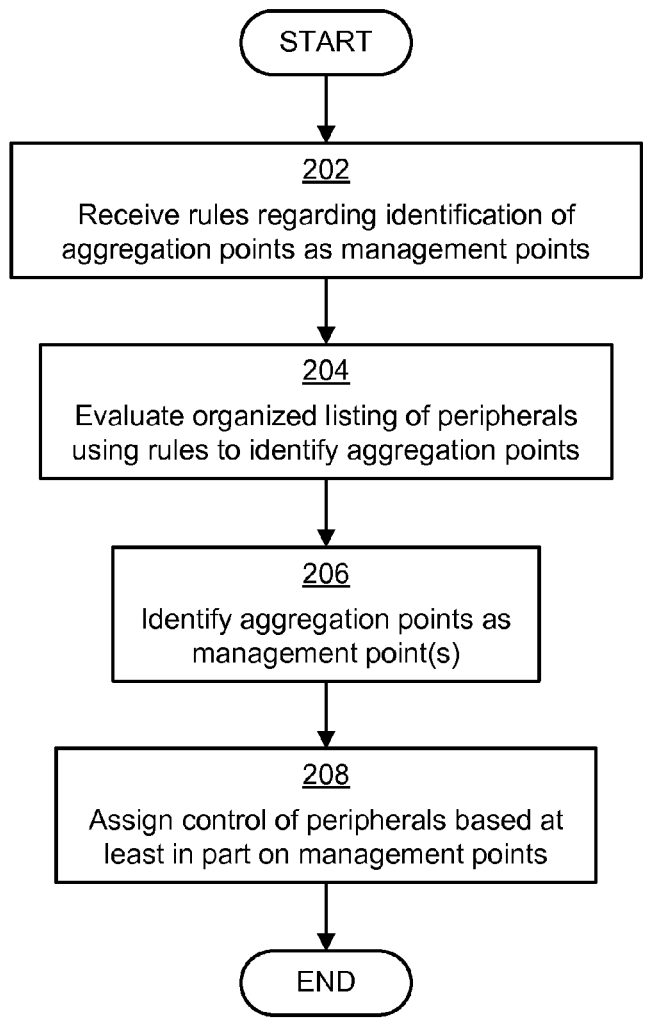
FIG. 2 is a flowchart of another exemplary process for assigning control of peripherals based at least in part on management points, in which hubs are identified as management points.

FIG. 2 illustrates one particular process for identifying management points in an organized listing of connections of peripherals to a computing device. The example of FIG. 2 shows a process that may be carried out with a particular set of rules and a particular set of connections. Embodiments are not limited to operating with these rules and these connections, and embodiments are not limited to carrying out the exemplary process illustrated in FIG. 2.

Prior to performance of the process 200, one or more peripherals are connected to a computing device at any suitable time. At least two of these peripherals are not connected directly to the computing device, but are instead connected via one or more aggregation points. An aggregation point, as used herein, is a device that allows for multiple peripherals to be connected to a computing device via a single port of the computing device by providing, at the aggregation point, multiple ports by which the peripherals may be connected and transferring information received over those multiple ports to the computing device via the single port of the computing device. One type of aggregation point is a hub. A hub connects to the single port and the hub has a number of ports by which peripherals can be connected to the hub. A USB hub is one example of a hub that may act as an aggregation point. In this way, a number of peripherals that are able to be connected to a computing device can be increased, by increasing the number of ports.

When aggregation points such as hubs are used in connection with a computing device, a user may identify a particular aggregation point as the one the user is using, and connect all peripherals that the user desires to use via that aggregation point. Where there are multiple users and multiple aggregation points, each user may identify an aggregation point as his/her aggregation point. All peripherals connected via a same aggregation point, therefore, should be assigned to a same user or user session. The rules evaluated by the process 200 are designed to identify aggregation points so as to identify peripherals for which control should be assigned together.

The process 200 begins in block 202, in which rules are received regarding how aggregation points are to be identified. The rules may identify aggregation points in any suitable manner For example, the rules may identify aggregation points by identifying intermediate nodes in a hierarchical topology of connections of peripherals to the computing device. In this example, the intermediate nodes to be identified may be any node in the hierarchy below which are one or more peripherals. Though, as discussed above, any suitable set of rules may be used, including any suitable set of rules for identifying aggregation points.

In block 204, the organized listing of peripherals is evaluated with the rules received in block 202. As a result of the evaluation, in block 206 a set of management points, each of which is an aggregation point (e.g., hub), is identified. In block 208, control of peripherals is assigned based on the management points. In block 208, control of each of the peripherals that are below a particular management point in the hierarchy—which are each of the peripherals that are connected to a particular aggregation point (e.g., hub)—is assigned in a similar way. For example, control of all of the peripherals below a particular management point in the hierarchy is assigned to a same user or a same user session. Once the control is assigned in block 208, the process 200 ends.

Figure 3B:
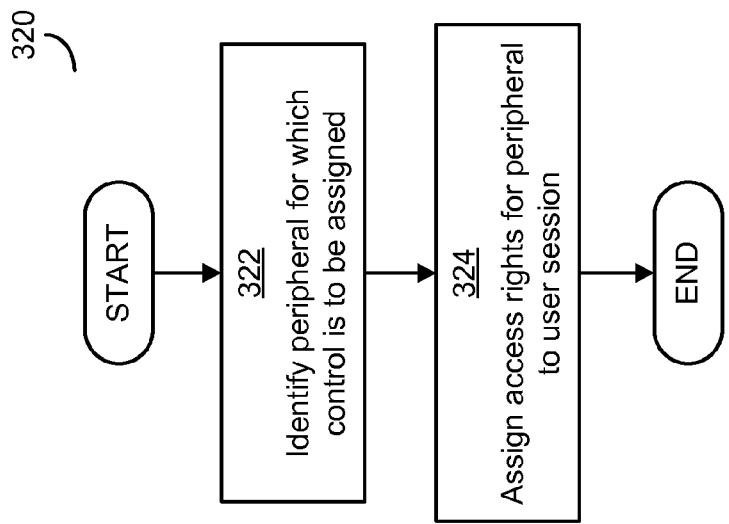
FIGS. 3A and 3B are flowcharts of exemplary techniques for assigning control of peripherals.
Figure 3A:
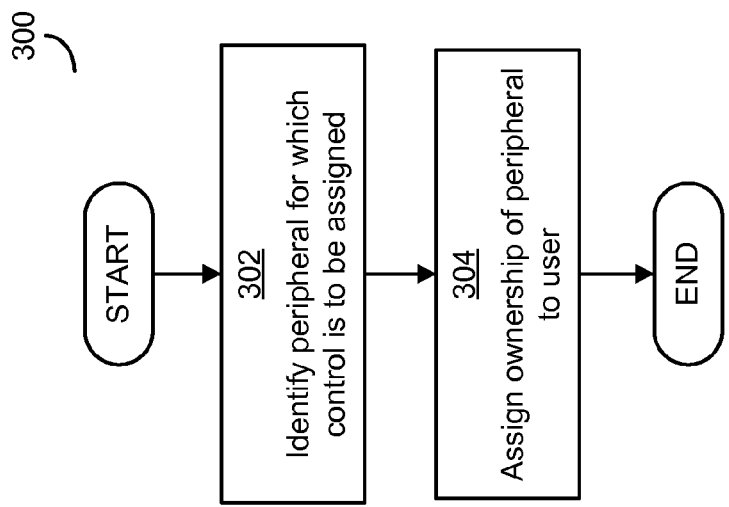

As discussed above, control of peripherals may assign in any suitable manner, and any suitable type of control may be assigned. FIGS. 3A and 3B illustrate exemplary processes that may be carried out for exemplary types of control to be assigned. Embodiments are not limited to implementing the exemplary processes illustrated in FIGS. 3A and 3B, nor are embodiments limited to operating with the exemplary types of control discussed in connection with these processes.

FIG. 3A illustrates a process 300 for assigning control of a peripheral by assigning ownership of a peripheral to a user of the computing device. Process 300 begins in block 302, in which a peripheral management facility identifies that control of a peripheral is to be assigned. The peripheral management facility may be configured to assign control by assigning ownership of the peripheral to a particular user. Assigning ownership of the peripheral grants to the user all access rights for using the peripheral as well as rights for managing the peripheral. Accessing the peripheral may include reading data from the peripheral, writing data to the peripheral, operating the peripheral to perform some task, or any other ways of interacting with the peripheral. Managing the peripheral may include disconnecting the peripheral, changing a driver for the peripheral, granting access to the peripheral to other parties, and other ways of configuring the peripheral and the way in which the peripheral interacts with the computing device. In block 304, ownership of the peripheral is assigned to the user by updating records of the computing device associated with the peripheral to identify that ownership of the peripheral has been assigned to the user. Once the records have been updated in block 304, the process 300 ends, and the user to which ownership was assigned will be able to access and/or manage the peripheral.

FIG. 3B illustrates a process 320 for assigning control of a peripheral by assigning access rights for a peripheral to a user session of the computing device. The access rights assigned may include rights to read data from a peripheral, rights to write data to the peripheral, and/or rights to use the peripheral to perform specified tasks. In block 322, a peripheral management facility identifies that control of a peripheral is to be assigned. The peripheral management facility may be configured to assign control by assigning access rights to a user session. In block 324, access rights for the peripheral are assigned by updating records of the computing device associated with the peripheral. Once the records have been updated in block 324, the process 320 ends, and a user operating the specified user session will be able to access the peripheral in the specified ways.

While FIGS. 3A and 3B are illustrated separately and described as alternative procedures, in some embodiments the processes may be used together. For example, direct ownership of a peripheral may be assigned to one particular user and access rights to the peripheral may be provided to all or specified user sessions.

Additionally, while FIG. 3A described as assigning ownership of a peripheral to a user and FIG. 3B described assigning access rights to a peripheral, embodiments are not limited to assigning rights control in precisely this manner. In some embodiments, for example, ownership may be assigned to a user session and/or access rights may be assigned to a user. Additionally, other types of control may be assigned. Embodiments are not limited to assigning any particular type of control or assigning control in any particular manner.

Figure 4:
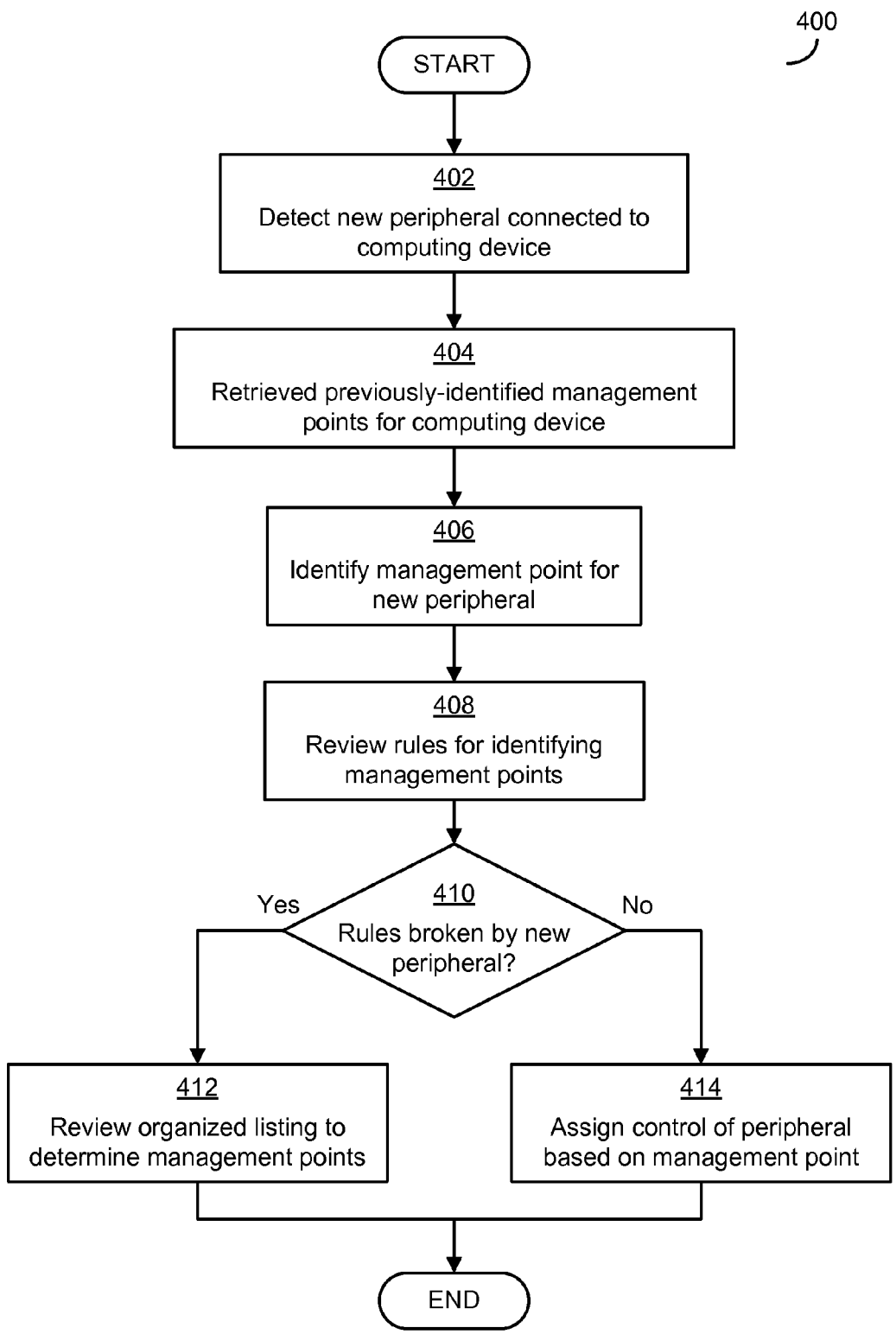
FIG. 4 is a flowchart of one exemplary process for assigning control of a peripheral that is newly-connected to a computing device based on management points previously identified for peripherals.

The process 100 described above included techniques for assigning control of peripherals already connected to a computing device by identifying management points in the topology of connections of peripherals to the computing device. FIG. 4 illustrates one process that may be used to assign control of peripherals newly connected to a computing device, after management points have been identified. Embodiments that implement a process for assigning control of new peripherals based on previously-identified management points are not limited to implementing the process illustrated in FIG. 4, as other processes are possible.

Prior to the start of process 400, a process (e.g., process 100 of FIG. 1) may have been performed for evaluating connections of computing devices to a computing device to identify management points. As a result of this previously-performed process, one or more management points may have been identified for assigning control of peripherals. When the management points are identified, an identification of the management points may have been stored. The identification of the management points may be stored in connection with the organized listing of connections of peripherals that was created by the device management facility or may have been stored in any other suitable manner.

The process 400 begins in block 402, in which a peripheral management facility detects that a new peripheral has been connected to the computing device. The new peripheral may be detected in any suitable manner, such as when the peripheral management facility receives a notification from a component of an operating system of the computing device, receives a notification from a driver for the peripheral, or receives a notification in any other suitable manner.

The new peripheral, when connected to the computing device, may be added to the organized listing of peripherals by the device management facility. Accordingly, a review of the organized listing may identify a manner in which the peripheral is connected to the computing device.

In block 404, the management points previously identified for the organized listing are retrieved and, in block 406, a management point related to the new peripheral is identified. The management point related to the new peripheral may be a management point that is identified based on a physical connection of the new peripheral to the computing device. For example, if each management point corresponds to an aggregation point (e.g., hub), the management point related to the new peripheral may be a management point related to an aggregation point to which the new peripheral is connected.

In block 408, the rules by which the management point was originally identified are reviewed to determine whether the connection of the new peripheral breaks one or more of the rules. If one or more of the rules are broken, then the previously-identified management point may no longer be a management point. Accordingly, in block 408, the rules are reviewed and, if it is determined in block 410 that one or more of the rules are broken, then in block 412 a determination is made to review the organized listing again and determine new management points. Reviewing the organized listing again and determining new management points may be carried out in any suitable manner, such as by performing again a previous process (e.g., process 100 of FIG. 1) for identifying management points. As part of reviewing the organized listing again, control of the new peripheral may be assigned.

However, if it is determined in block 410 that no rules are broken by the addition of the new peripheral, then in block 414 control of the new peripheral is assigned in a similar manner to the other, previously-connected peripherals related to the management point.

Once control of the new peripheral is assigned in either block 412 or 414, the process 400 ends.

In some cases, a management point for the new peripheral may not be identified in block 406, as the connection of the peripheral may not correspond to a previously-identified management point. In some such cases, a new management point may be identified for the peripheral by evaluating the rules, such as by carrying out a process like processes 100 or 200 of FIGS. 1-2. If a new management point is identified, however, then the new management point may be evaluated to determine whether the new management point breaks any of the rules, as discussed above in connection with blocks 408-410.

Figure 5:
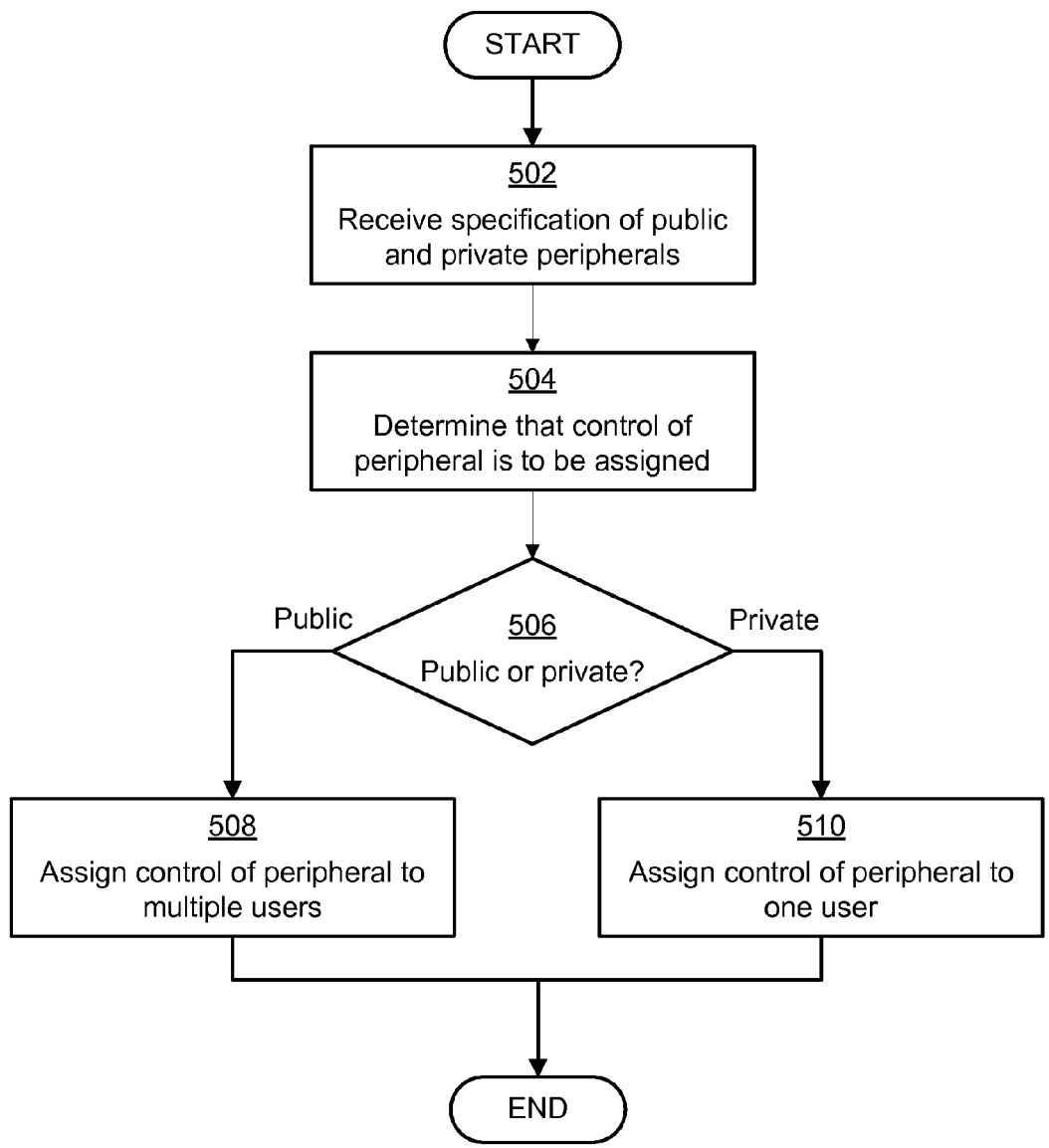
FIG. 5 is a flowchart of one exemplary process for assigning control of peripherals based at least in part on the type of peripheral.

In each of the examples discussed above, control of all of the peripherals related to a management point is assigned in a same manner Embodiments are not limited, however, to assigning control of all peripherals of a management point in a same manner, nor are embodiments limited to assigning control of peripherals in any other particular manner. FIG. 5 shows one process that may be carried out in some embodiments for assigning control of peripherals based on a type of peripheral.

Some peripherals may be categorized into one of two categories: peripherals that users intend to be used by one user (called "private" peripherals herein) and peripherals that users intend to be shared. A personal storage device such as a Flash memory drive may be a private peripheral, as a user that is using a Flash memory drive may intend the Flash memory drive to be operated only by that user. Interface devices (e.g., monitor, keyboard, mouse), cameras, and scanners may also be private peripherals in some cases. Users may intend that a printer be shared among the users, however, and as such a printer may be a public device.

In some embodiments, the process 500 of FIG. 5 may be used to assign control of peripherals based on a type of peripheral in addition to a management point associated with the peripheral.

Process 500 begins in block 502, in which a specification of public and private peripherals is received. The specification may be received in any suitable manner, including by being received directly from a user or administrator via an interface of the computing device or by being received as a policy received at the computing device in any suitable manner (e.g., via a network).

In block 504, a determination is made that control of a peripheral is to be assigned. The determination of block 504 may be made in any suitable manner, including during one of the processes 100 and 400 described above. In block 506, a determination is made regarding whether the peripheral for which control is to be assigned is a public or private peripheral, based on the specification received in block 502. If the peripheral is determined to be a public peripheral, then in block 508 control of the peripheral is assigned to multiple users, regardless of how control of other peripherals that are similarly connected is assigned. For example, in block 508 access rights to the peripheral may be assigned to multiple users. If the peripheral is determined in block 506 to be a private peripheral, though, then in block 510 control of the peripheral may be assigned to a single user, based on the management point and how control of other peripherals that are similarly connected is assigned.

Once control of the peripheral is assigned in one of block 508 and 510, the process 500 ends.

While process 500 described assigning control based on whether a peripheral is one of two types of peripherals, it should be appreciated that these types and this number of types is merely exemplary. Embodiments are not limited to determining whether a peripheral is any particular type or using any particular types of peripherals. Embodiments may determine whether a peripheral is any suitable type of peripheral and assign control of a peripheral based on any suitable type of peripheral.

In embodiments described above, a determination was made regarding connections of peripherals to a computing device, and physical connections of peripherals were discussed in examples. However, peripherals are not limited to being physically connected to a computing device. In some cases, peripherals may be physically connected to a second computing device and data received or generated by a peripheral may be sent to the computing device from the second computing device or may be sent by the computing device to the peripherals via the second computing device.

Devices may be virtually connected (i.e., connected to one computing device but interacting with another computing device) through the use of virtual hubs. A virtual hub may be added to an organized listing of peripherals on a first computing device, identifying peripherals remote from the first computing device and connected to a remote computing device. On the first computing device, the virtual hub may, rather than receiving data directly from peripherals, receive data from the remote computing device and, on the first computing device, may pass that information to a particular user or user session to which control of the virtual peripherals has been assigned. The data received from the remote computing device may be the data generated by peripherals on the remote computing device when a user operates the peripherals. In this way, a user or user session on the remote computing device may interact with the first computing device using peripherals on the remote computing device.

Figure 6:
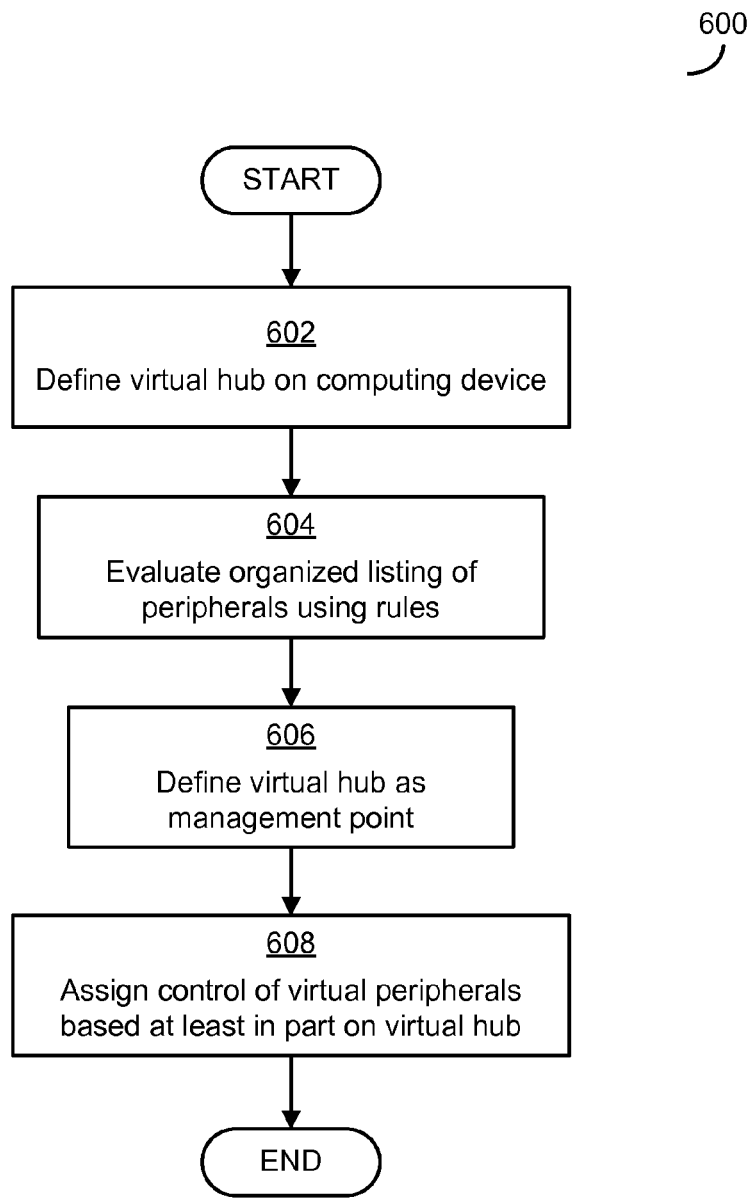
FIG. 6 is a flowchart of one exemplary process for assigning control of peripherals based at least in part on virtual hubs.

FIG. 6 illustrates one process for assigning control of peripherals using a virtual hub on a computing device to which the peripherals are not connected. Embodiments that assign control of virtual peripherals are not limited to implementing the exemplary process shown in FIG. 6. It should be appreciated that the process of FIG. 6 is substantially similar to the process described above for identifying management points based on physical aggregation points. In some embodiments, the process for identifying management points may identify management points based on aggregation points regardless of whether those aggregation points are physical or virtual, such that only a single process may be used.

Process 600 begins in block 602, in which a virtual hub is defined on the computing device. The virtual hub may be defined in block 602 in any suitable manner, including by editing the organized listing of peripherals that is maintained by the device management facility. Editing the organized listing may be carried out in any suitable manner, including by direct editing by a user or administrator or editing using a software facility. When the virtual hub is defined, information regarding the virtual hub may be added to the organized listing. When the virtual hub is defined, one or more virtual peripherals, which are the peripherals connected to the other computing device but which will communicate with this computing device, may be defined. The virtual peripherals may be defined as connected to the computing device via the virtual hub, forming a virtual topology in the organized listing.

In block 604, one or more rules for identifying management points are evaluated and the organized listing of peripherals reviewed, such that management points are identified. The evaluation of block 604 may be carried out in any suitable manner, including any of the exemplary techniques discussed above. In block 606, one or more management points are identified. The virtual hub that was added to the organized listing may be identified as a management point in block 606. The virtual hub may be identified as a management point for meeting the requirements for being defined as a management point. The virtual hub may meet the rules because the virtual hub was defined in such a manner as to meet the rules and be defined as a management point, may meet the rules because the rules specify that all virtual hubs will be defined as management points, or may meet the rules in any other manner. Regardless of what the rules are, in block 606, the virtual hub is defined as a management point.

In block 608, once the virtual hub is defined as a management point, control of each of the virtual peripherals connected via the virtual hub may be assigned in a similar manner, such as by being assigned to the same user or user session.

Once control of the peripherals is assigned in block 608, the process 600 ends. Following the process 600, the user or user session to which the virtual peripherals were assigned would be able to interact with the computing device using the peripherals connected to the other computing device or may be able to interact with the peripherals connected to the other computing device from the computing device on which the virtual hub was defined.

In various examples described above, once management points were defined, control of all peripherals associated with the management point was assigned in the same manner. In cases where peripherals were connected in a hierarchical topology, control of all peripherals below a management point in the hierarchy was assigned in a same manner, such as to a same user or user session. In some embodiments, though, management points may be identified in a hierarchy, such that one management point may be identified as a node below another management point in the hierarchy. This may be the case, for example, where a hub is connected to the computing device via another hub. This connection of hubs is referred to as "daisy-chaining" of hubs. In embodiments where a management point may be identified as below another in the hierarchy, not all peripherals below the topmost management point may have control assigned in the same manner. Rather, all peripherals below a first management point and not below a second management point may have control assigned in the same manner (e.g., assigned to a first user), and peripherals below the second management point may have control assigned in a different manner (e.g., to a second user).

Figure 7:
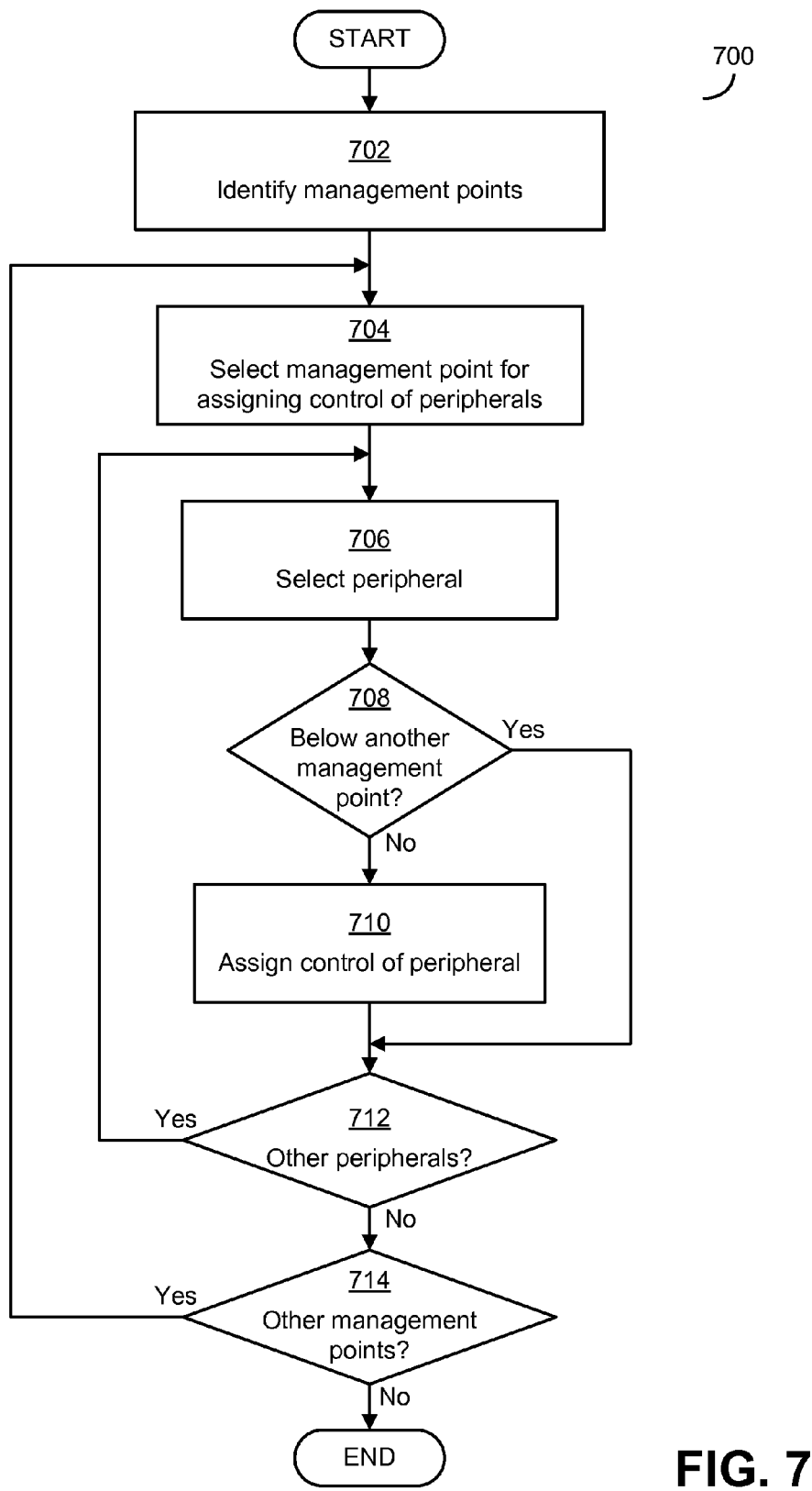
FIG. 7 is a flowchart of one exemplary process for assigning control of peripherals in cases where multiple management points in a hierarchy have been identified.

FIG. 7 illustrates one technique for assigning control of peripherals in embodiments that permit identification of management points above and/or below other management points in a hierarchy. Embodiments that permit identification of management points in this way are not limited to implementing the process illustrated in FIG. 7, as other processes are possible.

Process 700 begins in block 702, in which management points are identified based on evaluation of rules. The management points that are identified in block 702 may include at least two management points that are above and/or below one another in a hierarchy of the organized listing of peripherals.

In block 704, a management point is selected for assigning control of peripherals. In block 706, a peripheral is selected that is below the management point selected in block 704. In block 708, a determination is made regarding whether the peripheral that is below the management point selected in block 704 is also below another management point that is subordinate in the hierarchy to the management point selected in block 704. In other words, a determination is made in block 708 regarding whether the peripheral is below two or more management points. If the selected peripheral is not below another management point that is subordinate to the management point selected in block 704, then control is assigned in block 710. If, however, the peripheral is determined in block 708 to be below another management point that is subordinate, then control is not assigned for the peripheral.

Once control of the peripheral is assigned in block 710 or it is determined that control will not be assigned, then a determination is made in block 712 regarding whether more peripherals are below the management point selected in block 704. If so, then process 700 returns to block 706 and another peripheral is selected. If not, then process 700 continues to block 714 where a determination is made regarding whether other management points exist. If other management points exist, then process 700 continues to block 704 and another management point is selected. Other management points that may be selected include management points that are subordinate to previously-selected management points. For example, if a peripheral was determined in block 708 to be subordinate to another management point, and control was not assigned, then the other management point may be selected at a later time and control of that same peripheral may be assigned when that other management point is selected.

If it is determined in block 714 that no other management points exist, the process 700 ends.

As discussed above, embodiments are not limited to working with any particular computing device, peripheral, software facility, or type of control. Below is described one exemplary environment in which some embodiments may operate. Embodiments are not limited, though, to implementing any of the techniques described in connection with this exemplary embodiment or limited to operating with any of the exemplary types of devices and peripherals described in connection with this embodiment.

Figure 8:
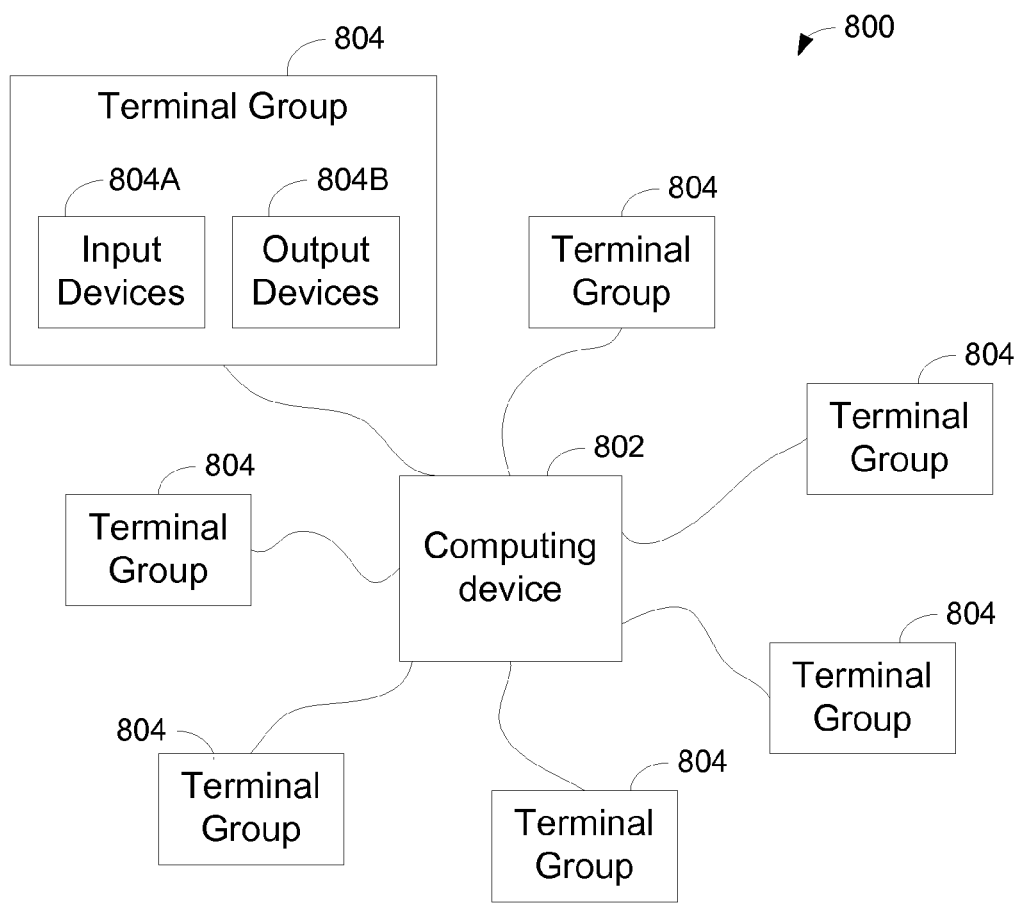
FIG. 8 is a block diagram of an exemplary computer system in which some embodiments may operate.

FIG. 8 illustrates one exemplary computer system 800 that includes a computing device 802. The computing device 802 may be adapted to be operated by multiple users simultaneously and to interact with each of the multiple users simultaneously. To enable each of the users to interact with the computing device 802, each user session that is associated with a user may be associated with a terminal group 804. Each terminal group 804 includes peripherals that are interface devices that a user can use to interact with the computing device 802, including input devices 804A to provide data to the computing device 802 and/or output device 804B to read data from the computing device 802. The peripherals of each terminal group may include any suitable number and type of peripherals, including a display, keyboard, and mouse, as well as any other type of peripheral (e.g., storage device). FIG. 8 illustrates seven terminal groups, but it should be appreciated that embodiments may operate with any suitable number of users and any suitable number of terminal groups.

Within each terminal group, peripherals may be connected to the computing device 802 in any suitable manner. In some cases, individual peripherals may be directly connected to ports of the computing device 802. In other cases, multiple peripherals may be connected to one port of a computing device via a hub having multiple input ports connected to each of the peripherals and one output port connected to the computing device 802. In some cases, some of the peripherals of a terminal group may be directly connected to the computing device 802 and others may be connected via a hub.

Figure 9:
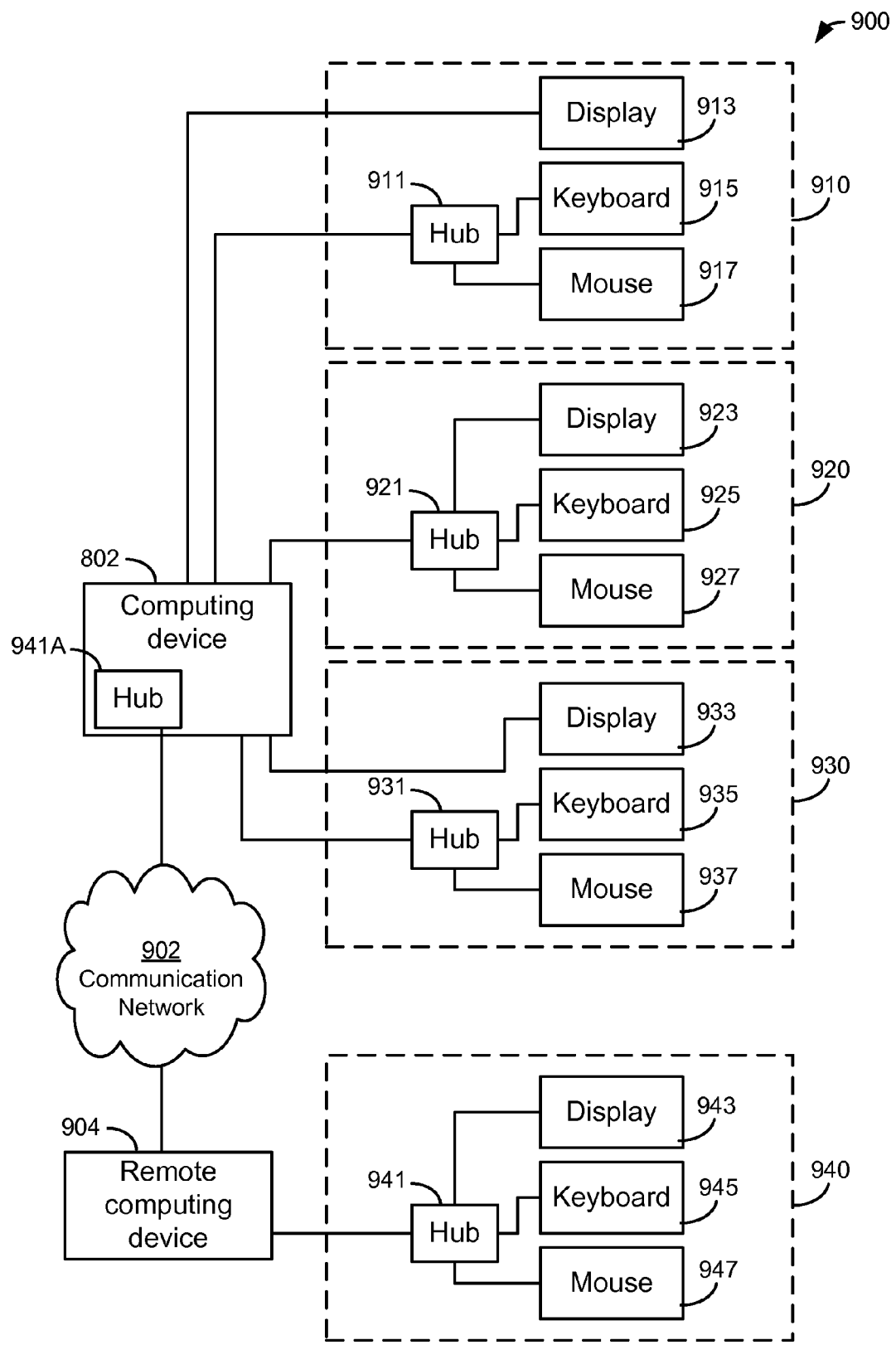
FIG. 9 is a block diagram of an exemplary computer system illustrating potential ways for connecting peripherals to a computing device.

FIG. 9 illustrates an exemplary connection of peripherals of terminal groups to a computing device 802. In a terminal group 910, a display 913 is directly connected to the computing device 802, such as via a video output port of the computing device 802. A keyboard 915 and a mouse 917 are connected to the computing device 802 indirectly, via a hub 911. The keyboard 915 and mouse 917 may be peripherals designed to be connected to the computing device 802 via Universal Serial Bus (USB), and the hub 911 may be a USB hub that has two or more input ports to connect to the keyboard 915 and mouse 917 and has one output port to connect to a USB port on the computing device 802. The hub acts to pass data back and forth between the computing device 802 and the peripherals 915, 917, as well as any other peripherals which are connected to the hub 911.

Terminal group 920 shows a slightly different arrangement, in which the display 923 of the terminal group 920 (and the keyboard 925 and the mouse 927) are connected to the computing device 802 via the hub 921. Terminal group 930 shows a configuration similar to terminal group 910, in which the display 933 is connected directly to the computing device 802 and the keyboard 935 and mouse 937 are connected via the hub 931.

Terminal group 940 shows an arrangement similar to terminal group 920, where the display 943, keyboard 945, and mouse 947 are connected to a remote computing device 904 via a hub 941. Remote computing device 904 is connected to the computing device 802 via a computer communication network 902. The peripherals 943, 945, 947 may communicate with the computing device 802, and may be managed according to, a virtual hub 941A defined on the computing device 802. The remote computing device 904 may be using a communication protocol to pass data entered via the keyboard 945 and mouse 947 to the computing device 802 via the network 902 and to pass graphic data generated by the computing device 802 to the display 943. Any suitable communication protocol may be used, including a terminal services protocol or a Microsoft® Remote Desktop Protocol (RDP), to pass data along any suitable wired and/or wireless communication network, including a local area network (LAN) and/or the Internet.

Figure 10:
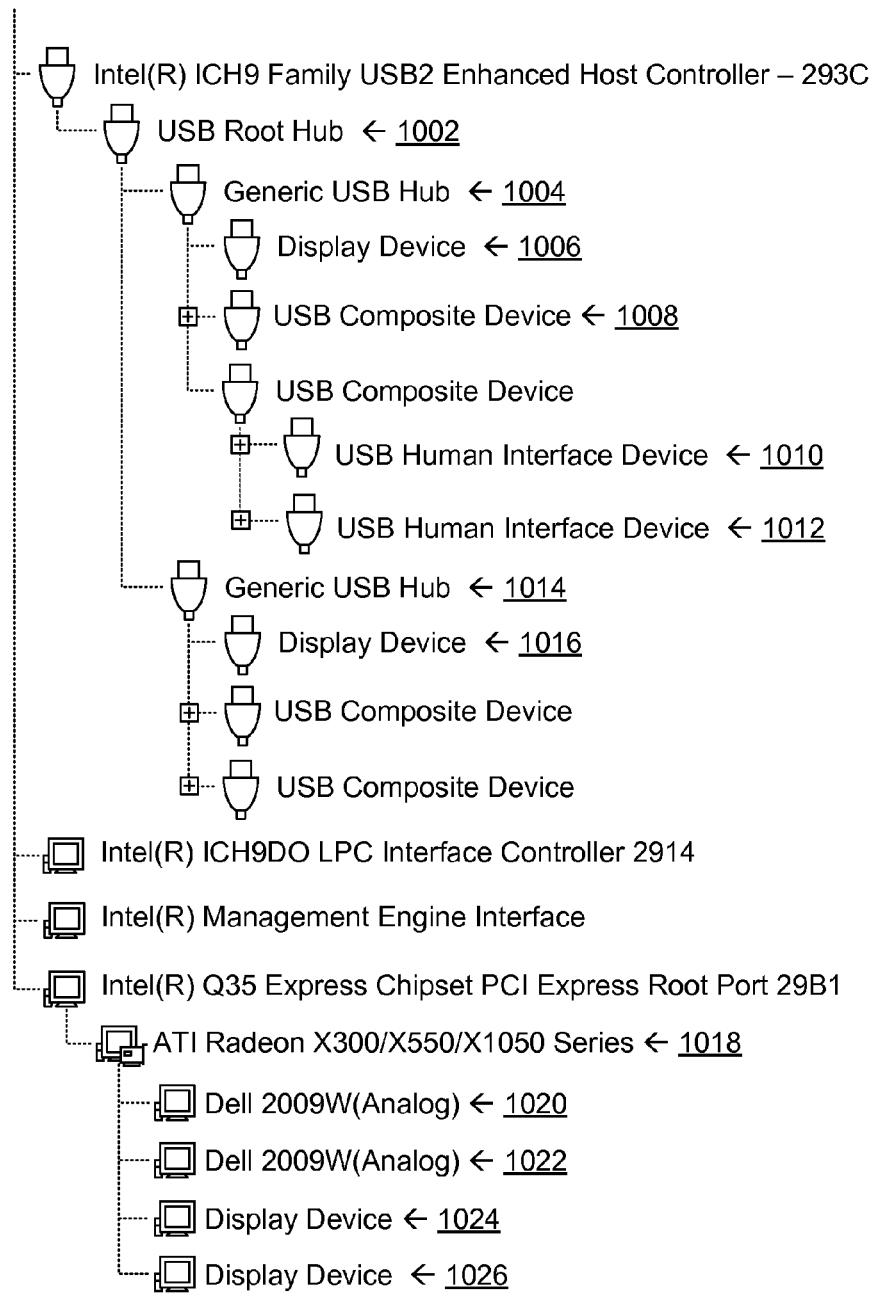
FIG. 10 is a diagram of an exemplary hierarchy of peripherals that may be created and managed by computing devices in some embodiments.

The computing device 802 may be configured to detect peripherals connected to the computing device 802 via the ports and communication buses of the computing device 802 and to determine a physical connection of computing devices. FIG. 10 illustrates one exemplary hierarchy 1000 of peripherals connected to a computing device 802. Among other hardware, the computing device 802 includes a USB Root hub 1002 that processes all data sent or received over the USB bus of the computing device 802 and a graphics card 1018 that processes all graphics data generated by the computing device 802 to be displayed to users. As shown in the example of FIG. 10, the computing device 802 has detected that a USB hub 1004 and a USB hub 1014 are connected to the USB Root hub 1002. Connected to the hub 1004 are peripherals including a display 1006, a composite device 1008, and interface device 1010 and 1012. Connected to the hub 1014 is a display device 1016 and USB composite devices. The computing device has also detected that, connected to the graphics card 1018, are displays 1020, 1022, 1024, and 1026.

When a peripheral is attached to the computing device 802, a determination may be made regarding to which terminal group (and which user session) to assign control of the peripheral. Such a process may be used to create terminal groups or to add peripherals to existing terminal groups.

Figure 11A:
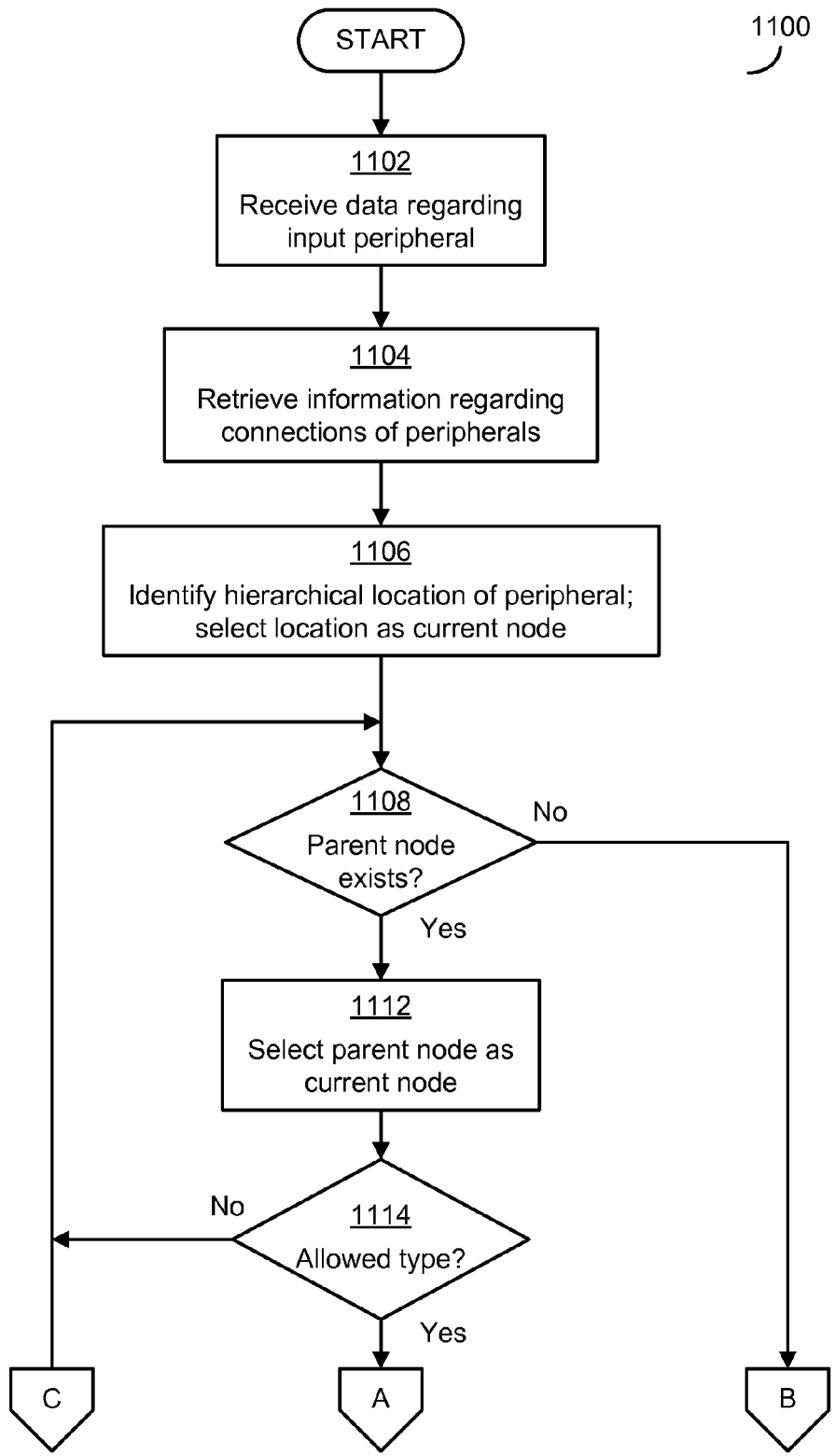
FIG. 11 (including FIGS. 11A and 11B) is a flowchart of one exemplary process for identifying management points based on rules.
Figure 11B:
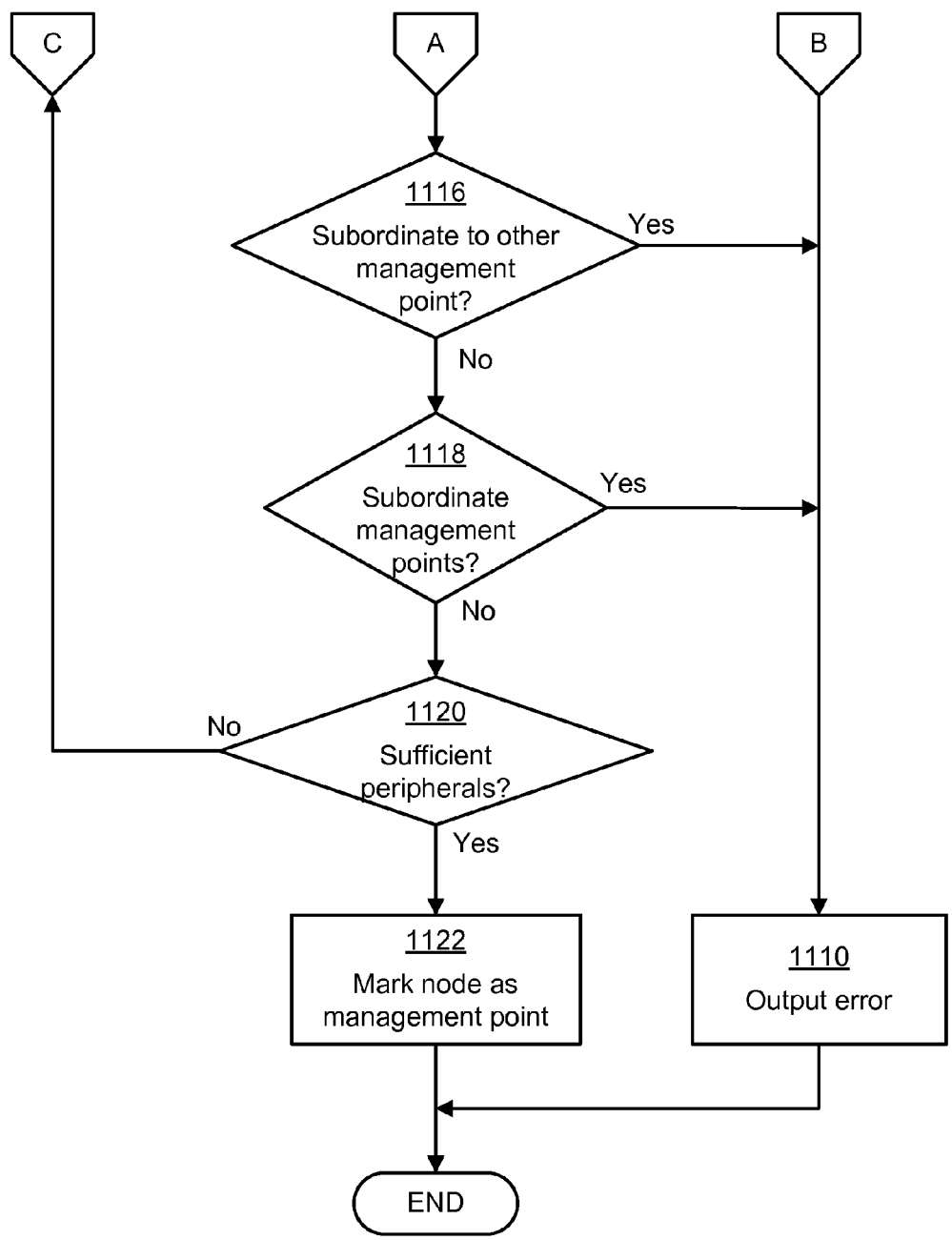

FIG. 11 (including FIGS. 11A and 11B) shows one process that may be used for assigning control of peripherals by reviewing a hierarchy, such as the hierarchy illustrated in FIG. 10, to identify management points. The process of FIG. 11 applies particular rules to identify management points in a particular manner Embodiments are not limited to applying these or any other particular rules, and embodiments are not limited to implementing the process illustrated in FIG. 11.

Process 1100 begins in block 1102, in which data is received regarding an input peripheral. The data that may be received regarding any suitable input peripheral including, for example, from a keyboard or a computer mouse. The data that is received may be received from the peripheral and may have been generated by the peripheral, such as by being generated in response to a user action, or may have been generated by any suitable facility of the computing device to which the peripheral is connected (e.g., a driver for the peripheral). The data may be generated by the facility when, for example, the input peripheral is first connected to the computing device. Regardless of the source of the data, receiving the data in block 1102 is a trigger to assign control of the input peripheral to a user session, such that the data can be properly processed on the computing device to which the peripheral is connected.

In block 1104, information regarding connections of peripherals to the computing device is retrieved. The information that is retrieved in block 1104 may include an organized listing of peripherals connected to the computing device, which may have a hierarchical organization that matches a hierarchical topology of connections of peripherals to the computing device. The organized listing retrieved in block 1104 may be similar to the organized listing illustrated in FIG. 10.

Based on the information retrieved in block 1104, in block 1106 the hierarchical location of the input peripheral from which input was received in block 1102 is identified and this location in the hierarchy is set as the "current node" in an analysis of the hierarchy for identifying a management point for the peripheral.

Identification of a management point for the peripheral may begin in block 1108, in which a determination is made of whether the current node has a parent node in the hierarchy. If no parent node exists for the current node, then no management point can be identified for the peripheral and an error message indicating this may be output (e.g., to a user or to a log) in block 1110. If a parent node exists for the current node, then in block 1112, a parent node of the current node is selected as the current node (i.e., the "current node" is changed).

In blocks 1114-1120, the current node may be evaluated using one or more rules to determine whether the current node qualifies as a management point under the rules. The rules that are evaluated in block 1114-1120 are merely exemplary of the types of rules that may be applied, as any suitable rules and any suitable criteria may be used in embodiments.

In block 1114, a determination is made regarding whether the current node is a type of node that is allowed to be a management point. In the example of FIG. 11, only physical or virtual hubs are permitted to be management points. Accordingly, in block 1114, a determination may be made regarding whether the current node is a physical or virtual hub. If not, then the process 1100 continues to block 1108 to determine whether a parent node exists for the current node.

If the current node is a physical or virtual node, however, then the process 1100 continues to block 1116 to determine whether the current node is a subordinate node to a previously-identified management point. In the example of FIG. 11, only one management point is permitted in each path through a hierarchy, and as such no management point may be subordinate to another. Though, in other embodiments, nesting of management points may be permitted and management points may be subordinate to other management points. If it is determined in block 1116 that the current node is subordinate to an existing management point, then a management point cannot be identified for the peripheral and an error message indicating this is output in block 1110.

If the current node is determined not to be a subordinate to any previously-identified management point, in block 1118 a similar process is carried out to determine whether any previously-identified management points are subordinate to the current node. This check may be conducted for the same purpose as the check of block 1116, to confirm that no path through the hierarchy would include more than one management point. If it is determined that there are management points subordinate to the current node, then a management point cannot be identified for the peripheral and an error message indicating this is output in block 1110.

If, however, it is determined that no previously-identified management points are subordinate to the current node, then process 1100 continues to block 1120 where a determination is made regarding whether a particular set of peripherals is below the node in the hierarchy. In block 1120, peripherals that are subordinate to the current node may be reviewed to determine whether the peripherals subordinate to the current node include sufficient peripherals for the current node to be determined to be a management point and do not include peripherals that would make the current node ineligible to be a management point. For example, in some implementations, a review may be carried out to determine that, subordinate to the current node, there is only one keyboard, one mouse, and one display, such that only one terminal group can be formed from peripherals subordinate to the current node.

If the current node does not pass the other rules checked in block 1120, then process 1100 continues to block 1108 to determine whether a parent node exists for the current node. If, however, the current node passes the rules checked in block 1120, then in block 1122 the current node is declared to be the management point for the input peripheral from which data was received in block 1102.

Once the current node is marked as a management node in block 1122, or an error message is displayed in block 1110, the process 1100 ends. Following the process 1100, if a management node is identified for the input peripheral, control of the input peripheral can be assigned based at least in part on the management node. For example, as discussed above, control of all peripherals below a management node in the hierarchy may be assigned to a same user session or a same user.

Various rules-based techniques described herein may not be successful for identifying complete terminal groups in all cases. For example, the display devices connected to the computing device 802 via the graphics card 1018 are shown in a different hierarchy from the peripherals connected to the computing device 802 via the USB Root hub 1002. A rules-based analysis of the USB hierarchy might not process the display devices, and vice versa. Additionally, because there is no correlation between the hierarchies, there may not be a way for a rules-based analysis to match display devices to USB devices. Accordingly, attempts to identify a complete terminal group (e.g., a display, keyboard, and mouse) for a user based only on a rules-based analysis of the peripherals in an organized listing may not be successful in all cases. Rather, some additional input may be useful or necessary in identifying all elements of a terminal group. Further, input from a user may be used in some cases to associate terminal groups with user sessions.

In some embodiments, to match display devices to other peripherals (e.g., USB devices), a user-assisted process may be carried out that may include displaying a particular output on each display device (e.g., "Press 'A' on your keyboard") and accepting input from input devices. Matches between the output and the input can then be detected to match a display device to at least one input device. Techniques that use such a prompt to users may be carried out in any suitable manner, including according to techniques described in the '039 and '766 applications referenced above.

In other embodiments, however, display devices may be connected to a computing device via a same bus as other types of peripherals, including other input peripherals. For example, some display devices are able to be connected to a computing device using a USB adapter and as such will show up with a same hierarchy as a USB keyboard and USB mouse. Other buses may also support display devices as well as input devices like keyboards and mice. Where display devices are connected via same bus as input devices, a terminal group that includes each of a keyboard, a mouse, and a display could be formed by identifying as a management point those points in a node below which are a display, keyboard, and mouse.

Techniques operating according to the principles described herein may be implemented in any suitable manner Included in the discussion above are a series of flow charts showing the steps and acts of various processes that assign control of peripherals of a computing device based at least in part on identifying management points in an organized listing of peripherals. The processing and decision blocks of the flow charts above represent steps and acts that may be included in algorithms that carry out these various processes. Algorithms derived from these processes may be implemented as software integrated with and directing the operation of one or more multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit, or of any particular programming language or type of programming language. Rather, the flow charts illustrate the functional information one of ordinary skill in the art may use to fabricate circuits or to implement computer software algorithms to perform the processing of a particular apparatus carrying out the types of techniques described herein. It should also be appreciated that, unless otherwise indicated herein, the particular sequence of steps and acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, or any other suitable type of software. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations needed to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application, for example as a software program application such as Microsoft® Windows® MultiPoint Server 2010. In other implementations, the functional facilities may be adapted to interact with other functional facilities in such a way as form an operating system, including the Windows® operating system, available from the Microsoft® Corporation of Redmond, Wash. In other words, in some implementations, the functional facilities may be implemented alternatively as a portion of or outside of an operating system.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 1206 of FIG. 12 described below (i.e., as a portion of a computing device 1200) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system. Functional facilities that comprise these computer-executable instructions may be integrated with and direct the operation of a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system.

Figure 12:
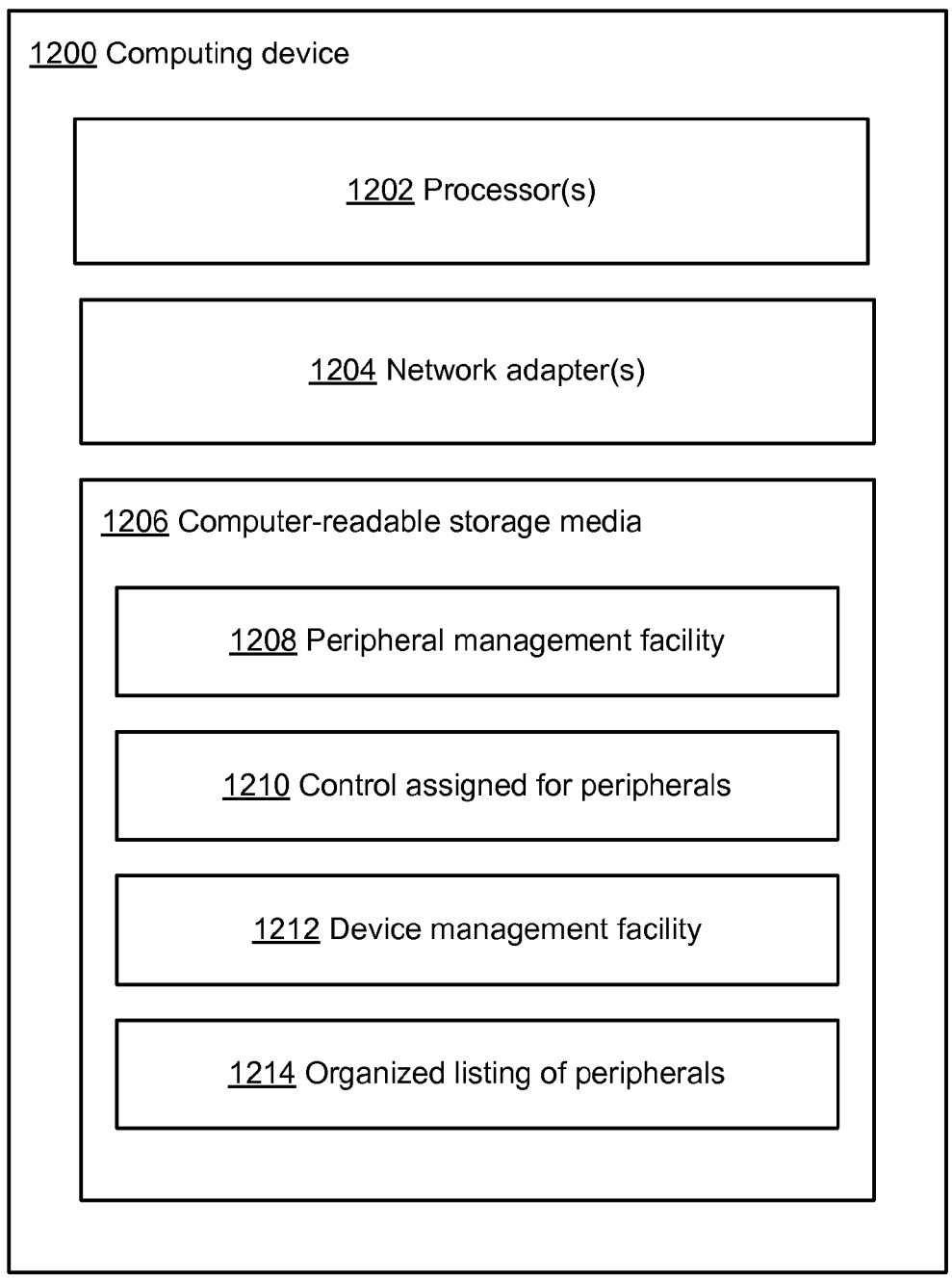
FIG. 12 is a block diagram of one exemplary computing device with which some embodiments may operate.

FIG. 12 illustrates one exemplary implementation of a computing device in the form of a computing device 1200 that may be used in a system implementing the techniques described herein, although others are possible. It should be appreciated that FIG. 12 is intended neither to be a depiction of necessary components for a computing device to operate in accordance with the principles described herein, nor a comprehensive depiction.

Computing device 1200 may comprise at least one processor 1202, a network adapter 1204, and computer-readable storage media 1206. Computing device 1200 may be, for example, a desktop or laptop personal computer, a mainframe, a server, a portable digital device such as a smart mobile phone, personal digital assistant, or portable gaming console, or any other suitable computing device. Network adapter 1204 may be any suitable hardware and/or software to enable the computing device 1200 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media 1206 may be adapted to store data to be processed and/or instructions to be executed by processor 1202. Processor 1202 enables processing of data and execution of instructions. The data and instructions may be stored on the computer-readable storage media 1206 and may, for example, enable communication between components of the computing device 1200.

The data and instructions stored on computer-readable storage media 1206 may comprise computer-executable instructions implementing techniques which operate according to the principles described herein. In the example of FIG. 12, computer-readable storage media 1206 stores computer-executable instructions implementing various facilities and storing various information as described above. Computer-readable storage media 1206 may store a peripheral management facility 1208 that assigns control of peripherals connected to the computing device 1200. Computer-readable storage media 1206 may also store a data store 1208 of information regarding control assigned for peripherals connected to the computing device 1200 (e.g., ownership or access rights assigned for peripherals, and to which user session the ownership or access rights were assigned). Computer-readable storage media 1206 may additionally storage a device management facility 1210 for creating an organized listing of peripherals connected to the computing device 1200, as well as a data store 1212 of information about the organized listing of peripherals.

While not illustrated in FIG. 12, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method for assigning control of peripherals connected to a computing device, the method comprising:
    reviewing a hierarchy of connections of peripherals to the computing device to identify management points in the hierarchy, the reviewing comprising evaluating at least one rule for identifying management points; and
    for a management point identified in the reviewing, assigning control of each peripheral below the management point in the hierarchy to a same user session or to a same user.

2. The method of claim 1, wherein reviewing the hierarchy to identify management points comprises identifying at least one physical hub connected to the computing device as a management point.

3. The method of claim 1, further comprising, in response to a new peripheral being connected to the computing device:
    identifying a corresponding management point above the new peripheral in the hierarchy; and
    assigning control of the new peripheral as other peripherals below the corresponding management point in the hierarchy.

4. The method of claim 3, wherein assigning control of the new peripheral comprises assigning control of the new peripheral to a same user session as other peripherals below the corresponding management point in the hierarchy.

5. The method of claim 1, wherein reviewing the hierarchy of connections of peripherals comprises reviewing a hierarchy of physical connections of peripherals to the computing device, wherein a peripheral connected to the computing device via a hub is located below the hub in the hierarchy.

6. The method of claim 1, wherein reviewing the hierarchy to identify management points comprises identifying a first management point and a second management point in the hierarchy, the second management point being subordinate to the first management point in the hierarchy, and
    wherein assigning control of each peripheral below the first management point comprises assigning control of each peripheral below the first management point and not below the second management point in a first manner and assigning control of each peripheral below both the first management point and the second management point in a second manner.

7. The method of claim 1, further comprising:
    receiving a policy comprising the at least one rule for identifying management points in the hierarchy.

8. At least one computer-readable storage medium encoded with computer-executable instructions that, when executed by a computer, cause the computer to carry out a method for assigning control of peripherals connected to a computing device, the method comprising:

reviewing a hierarchy of connections of peripherals to the computing device to identify management points in the hierarchy, the reviewing comprising evaluating at least one rule for identifying management points, the hierarchy corresponding to a hierarchy of physical connections of peripherals to the computing device, wherein a peripheral connected to the computing device via a hub is located below the hub in the hierarchy; and for a management point identified in the reviewing, assigning control of each peripheral below the management point in the hierarchy to a same user session, wherein assigning control is performed without user input regarding assignment of control.

9. The at least one computer-readable storage medium of claim 8, wherein the method further comprises, in response to a new peripheral being connected to the computing device:

identifying a corresponding management point above the new peripheral in the hierarchy; and assigning control of the new peripheral in the same manner as other peripherals below the corresponding management point in the hierarchy.

10. The at least one computer-readable storage medium of claim 9, wherein identifying a corresponding management point comprises identifying a new management point in the hierarchy for the new peripheral.

11. The at least one computer-readable storage medium of claim 8, further comprising:

for a second management point identified in the reviewing, assigning control of each peripheral below the second management point in the hierarchy to a second same user session, the second management point being located below the management point in the hierarchy.

12. The at least one computer-readable storage medium of claim 8, wherein the reviewing comprises reviewing a hierarchy comprising a virtual hub and at least one peripheral located below the virtual hub in the hierarchy, the at least one peripheral below the virtual hub being a peripherals connected to a second computing device remote from the computing device.

13. The at least one computer-readable storage medium of claim 8, wherein the method further comprises receiving, via a network, a policy comprising the at least one rule for identifying management points in the hierarchy, the policy being a part of a network policy applied for the network.

14. The at least one computer-readable storage medium of claim 8, wherein the method further comprises receiving user input specifying a policy comprising the at least one rule for identifying management points in the hierarchy.

15. An apparatus comprising:

at least one processor adapted to:

review a hierarchy of connections of peripherals to a computing device to identify management points in the hierarchy, the reviewing comprising evaluating at least one rule for identifying management points; and for a management point identified in the reviewing, assign control of each peripheral below the management point in the hierarchy to a same user or to a same user session.

16. The apparatus of claim 15, wherein reviewing the hierarchy to identify management points comprises identifying at least one physical hub connected to the computing device as a management point.

17. The apparatus of claim 15, wherein the at least one processor is further adapted to, in response to a new peripheral being connected to the computing device:

identify a corresponding management point above the new peripheral in the hierarchy; and assign control of the new peripheral in a same manner as other peripherals below the corresponding management point in the hierarchy.

18. The apparatus of claim 15, wherein the at least one processor is adapted to review by reviewing a hierarchy comprising a virtual hub and at least one peripheral located below the virtual hub in the hierarchy, the at least one peripheral below the virtual hub being a peripherals connected to a second computing device remote from the computing device.

* * * * *